E. SCHORR.
AUTOMOBILE SUSPENSION.
APPLICATION FILED NOV. 25, 1910.
1,007,313.
Patented Oct. 31, 1911.
7 SHEETS—SHEET 1.
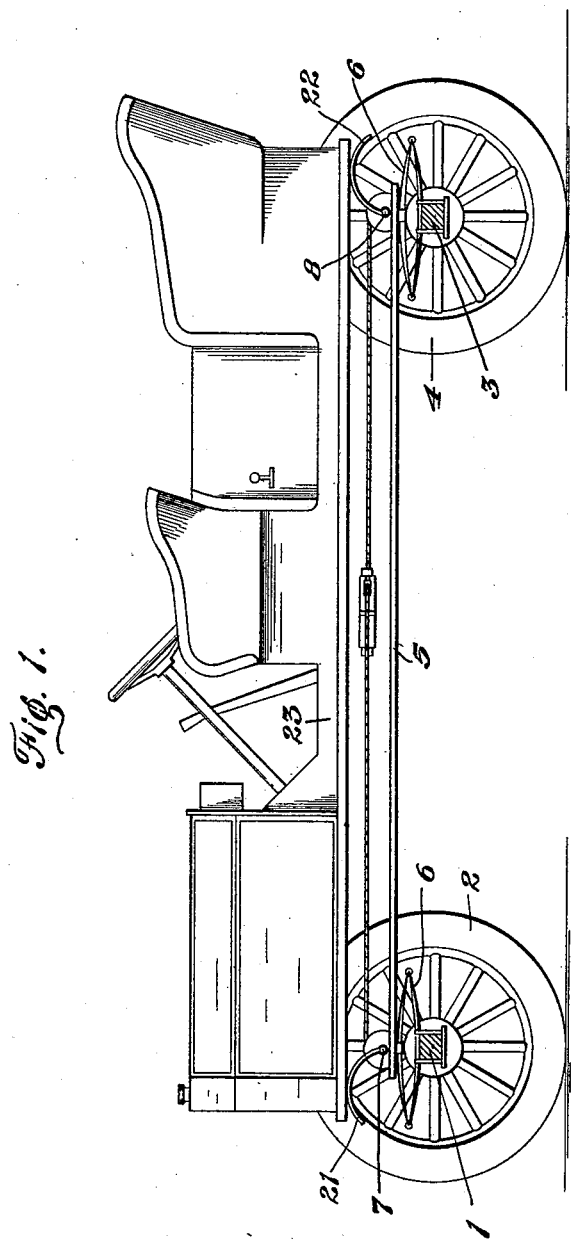
Witnesses
Chas. W. Stauffiger
A. M. Dow.
Inventor
ERNEST SCHORR.
By
Attorneys E. SCHORR.
AUTOMOBILE SUSPENSION.
APPLICATION FILED NOV. 25, 1910.
1,007,313.
Patented Oct. 31, 1911.
7 SHEETS—SHEET 2.
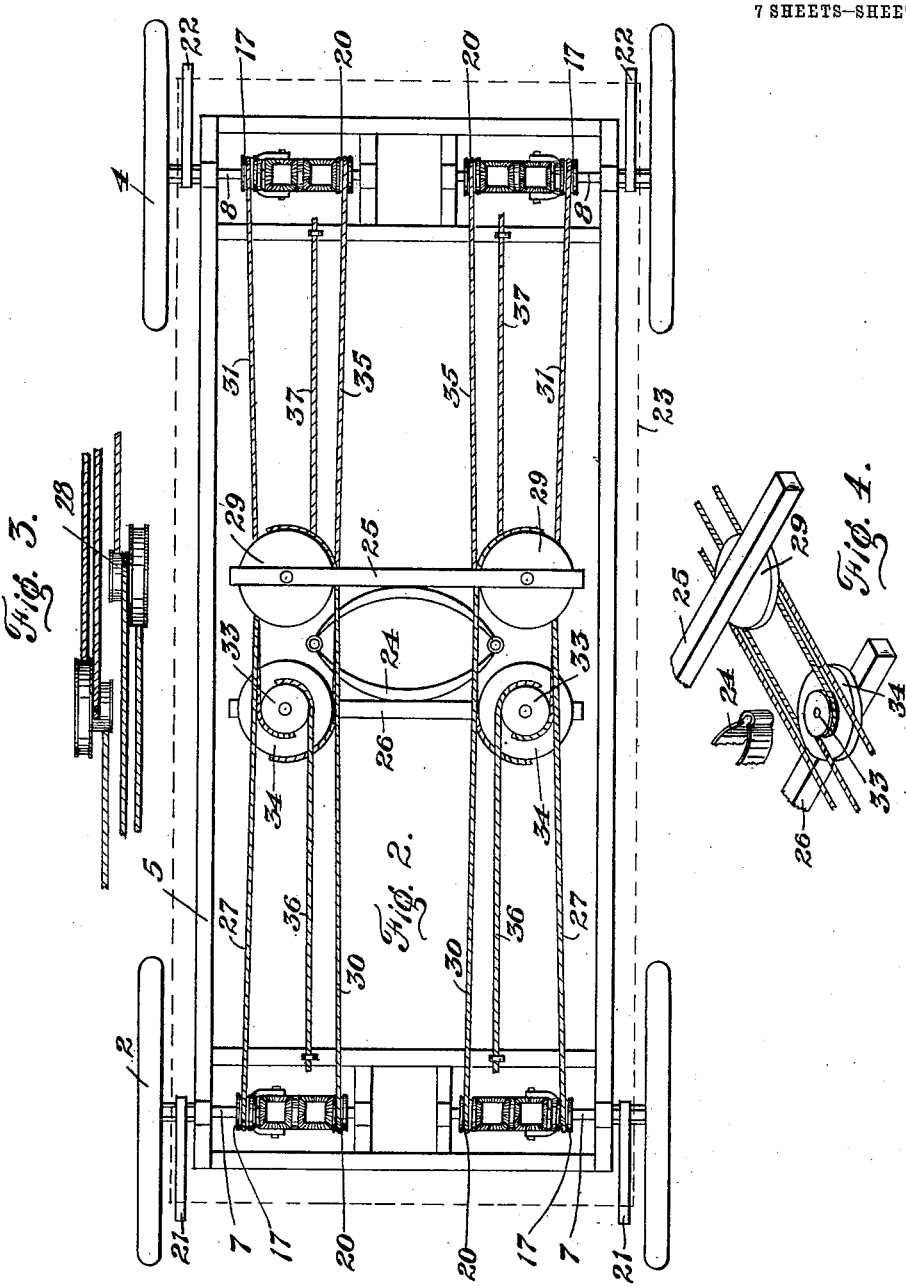
Witnesses
Chas. W. Stauffiger
A. M. Dow
Inventor
ERNEST SCHORR.
Attorneys

E. SCHORR.
AUTOMOBILE SUSPENSION.
APPLICATION FILED NOV. 25, 1910.

1,007,313.

Patented Oct. 31, 1911.

7 SHEETS—SHEET 3.

Witnesses
Chas. W. Stauffiger
A. M. Dow

Inventor
ERNEST SCHORR.

By
Attorneys

E. SCHORR.
AUTOMOBILE SUSPENSION.
APPLICATION FILED NOV. 25, 1910.
1,007,313.
Patented Oct. 31, 1911.
7 SHEETS—SHEET 5.
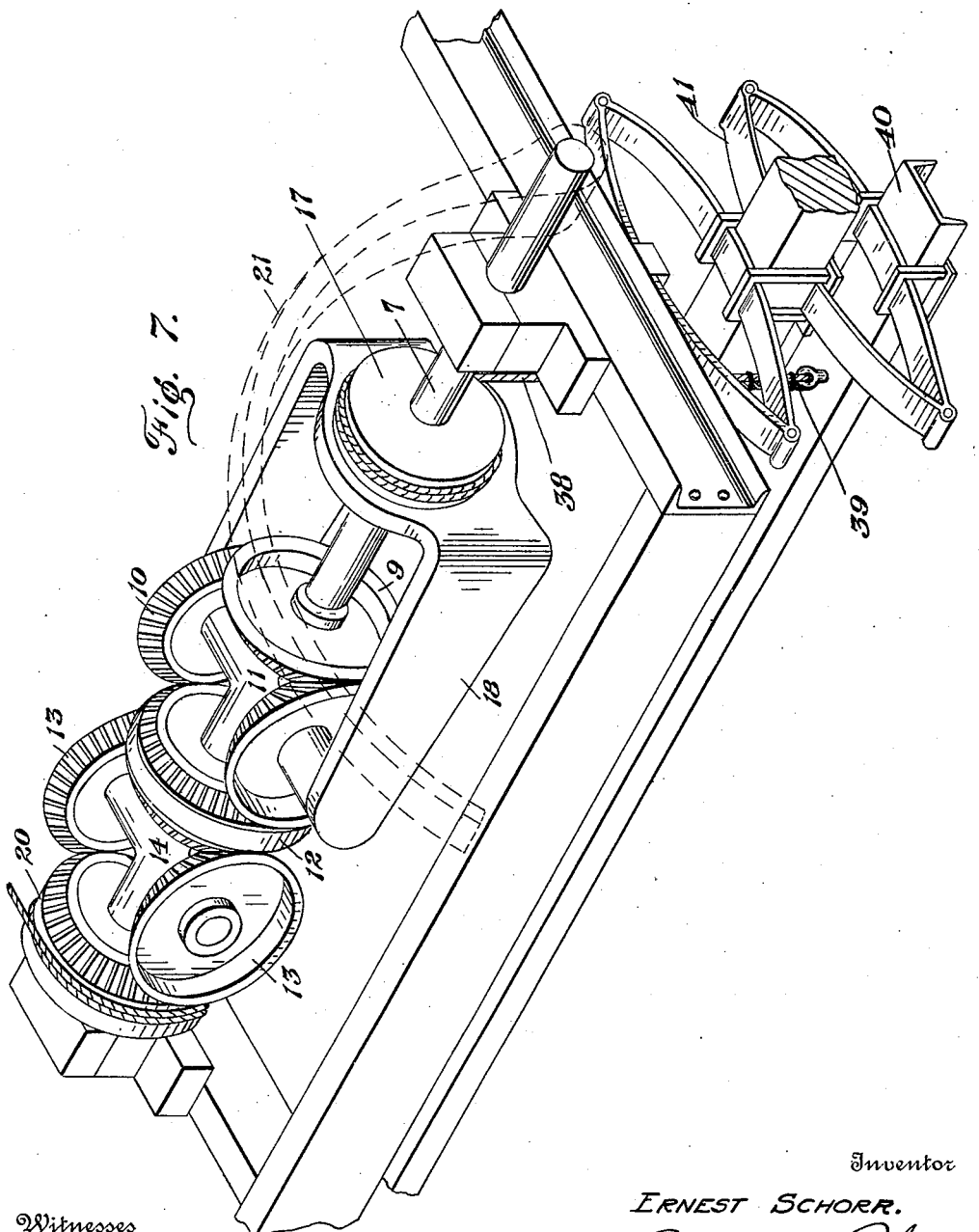
Fig. 7.
Witnesses
Chas. W. Stauffiger
A. M. Dorr
Inventor
ERNEST SCHORR.
By
Attorneys

E. SCHORR.
AUTOMOBILE SUSPENSION.
APPLICATION FILED NOV. 25, 1910.

1,007,313.

Patented Oct. 31, 1911.
7 SHEETS—SHEET 6.

Witnesses
Chas. W. Stauffiger
A. M. Dow.

Inventor
ERNEST SCHORR.
By
Attorneys

E. SCHORR.
AUTOMOBILE SUSPENSION.
APPLICATION FILED NOV. 25, 1910.
1,007,313.
Patented Oct. 31, 1911.
7 SHEETS—SHEET 7.
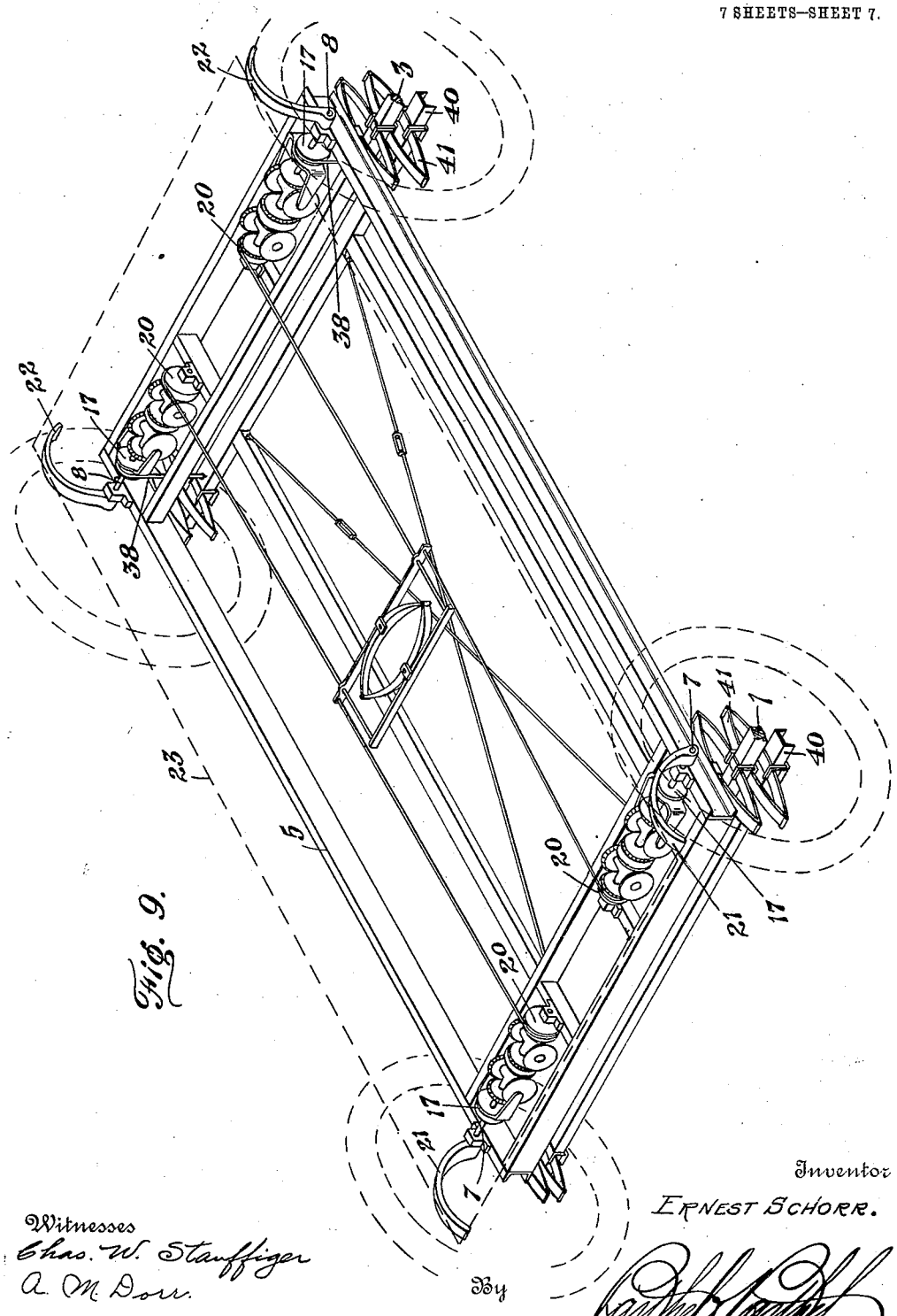
Fig. 9.
Witnesses
Chas. W. Stauffiger
A. M. Dorr.
Inventor
ERNEST SCHORR.
By 
Attorneys

UNITED STATES PATENT OFFICE.

ERNEST SCHORR, OF DETROIT, MICHIGAN.

AUTOMOBILE SUSPENSION.

1,007,313.      Specification of Letters Patent.      Patented Oct. 31, 1911.

Application filed November 25, 1910. Serial No. 594,006.

*To all whom it may concern:*

Be it known that I, ERNEST SCHORR, a citizen of the United States of America, residing at Detroit, in the county of Wayne and State of Michigan, have invented certain new and useful Improvements in Automobile Suspension, of which the following is a specification, reference being had therein to the accompanying drawings.

In the usual method of suspending automobile bodies all vertical motions thereof relative to the axles are usually taken care of by vertical springs whose oscillations are frequently violent and whose recoils cause the body to oscillate.

This invention relates to means for suspending an automobile body whereby the relative movements of the axles and body are translated into horizontal oscillations of the spring members.

The invention consists in the matters hereinafter set forth, and more particularly pointed out in the appended claims.

Figure 5:
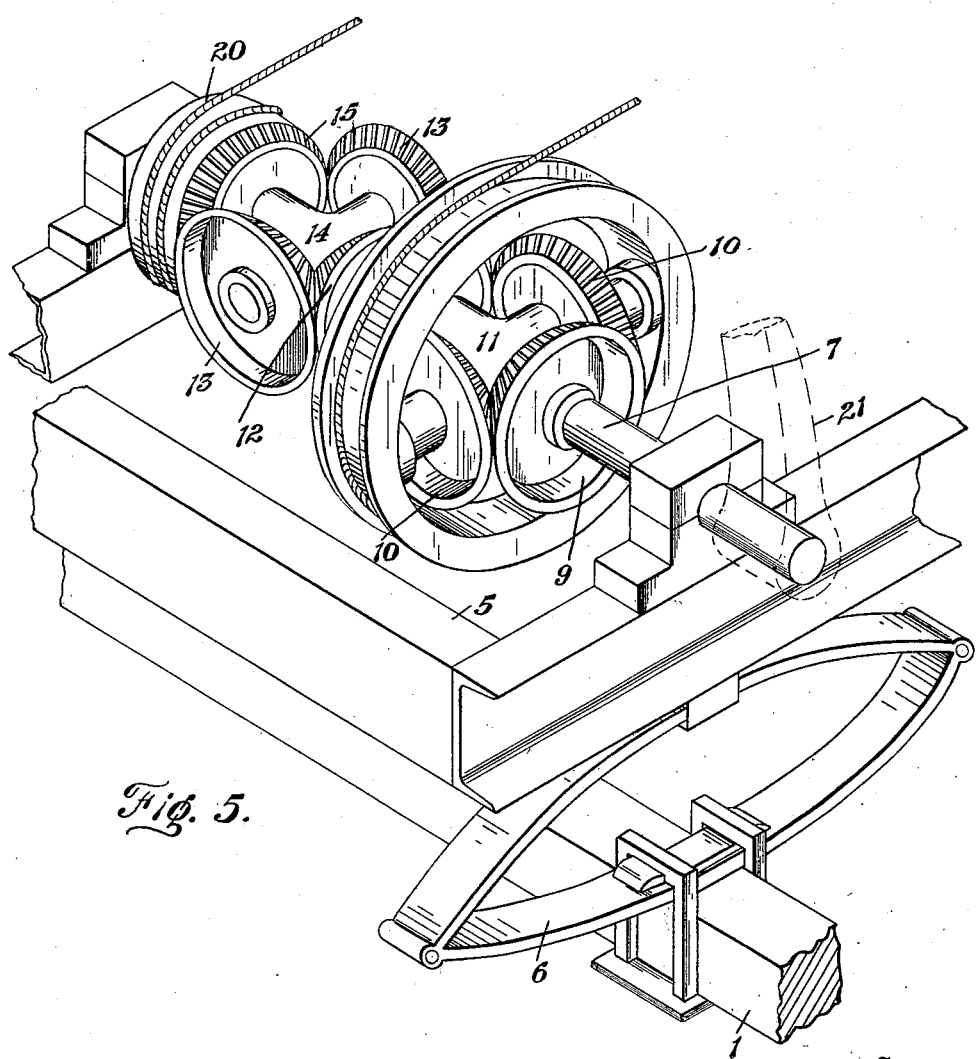
Figure 6:
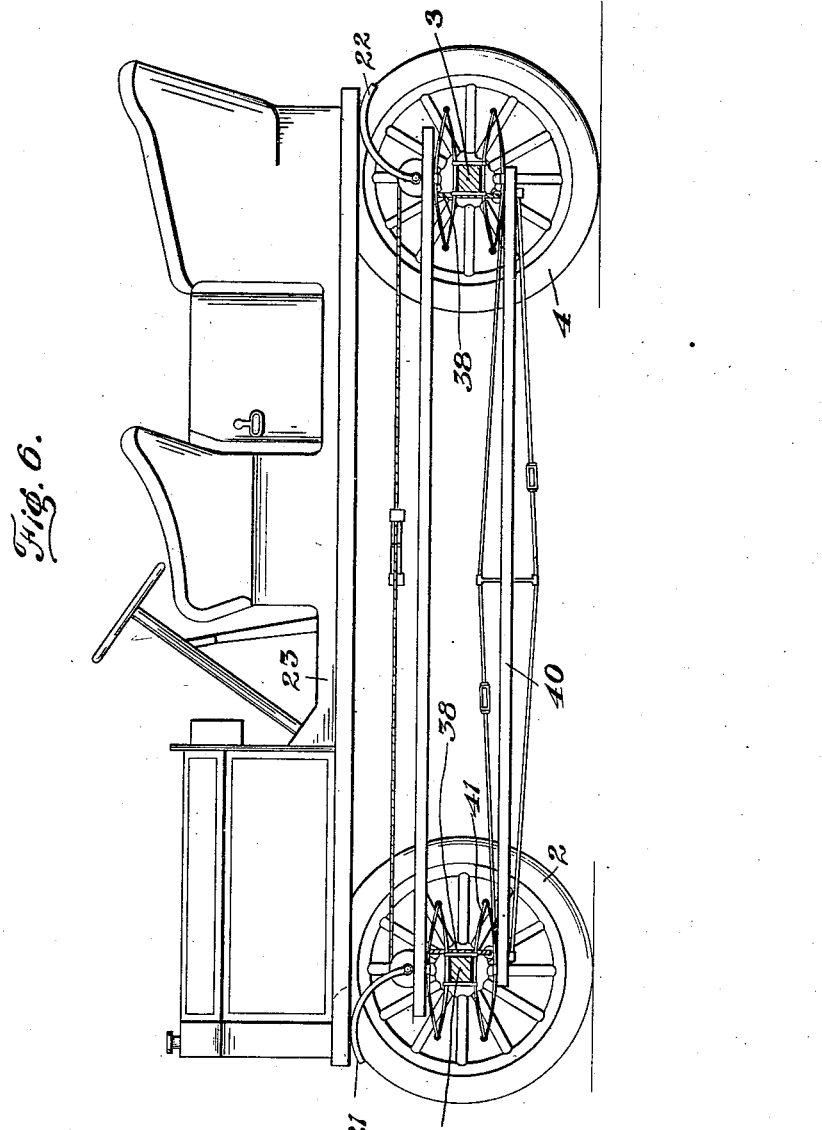
Figure 8:
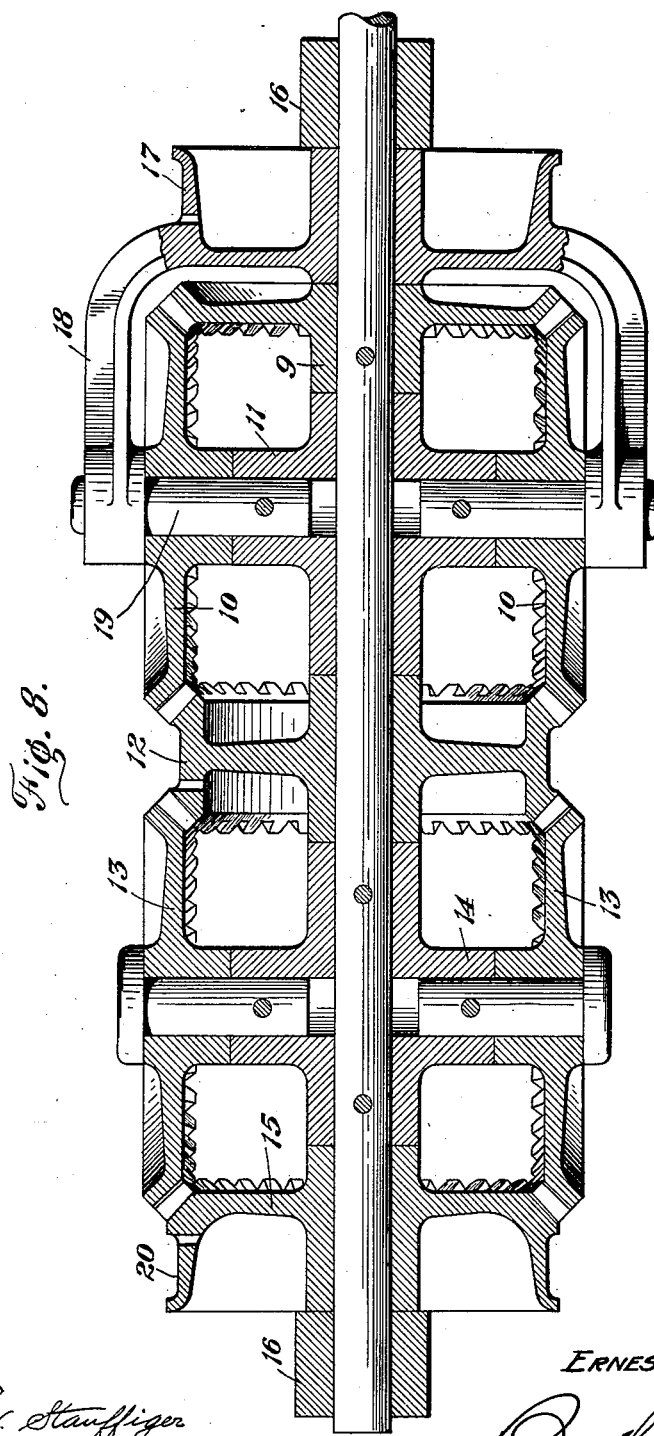

In the drawings, Figure 1 is a view partly in side elevation and partly in section with the transmission mechanism omitted of an automobile; Fig. 2 is a plan view thereof with the tonneau removed; Figs. 3 and 4 are views in detail of a differential pulley compensating mechanism; Fig. 5 is a view in perspective of a compensating gear; Fig. 6 is a view in side elevation of a modification of the arrangement of the suspending device; Fig. 7 is a view in perspective of a modification of the compensating gear; Fig. 8 is a view in longitudinal section of the compensating mechanism shown in Fig. 7, and of the arrangement of the gears themselves as illustrated in Fig. 5; and Fig. 9 is a view in perspective with the tonneau removed of the suspension shown in Fig. 6.

Referring to the drawings a forward axle 1 with bearing wheels 2 and a rear axle 3 with traction bearing wheels 4 are held in spaced relation as by a frame 5 yieldingly mounted thereon by springs 6 of any preferred type. A pair of axially alined transversely disposed shafts 7 are journaled near the forward end of the frame 5, preferably above the forward axle, and a second pair of shafts 8 are similarly placed near the rear end of the main frame. A reduction gear train of the planetary type is mounted on each of these axles. As herein indicated a main gear 9 is non-rotatably secured to the shaft and is in mesh with a pair of idler gears 10 journaled at opposite extremes of a yoke 11 that is rotatable on the shaft. The gears 10 are in mesh with an intermediate double gear 12 journaled on the shaft the teeth of whose other face engage a pair of pinions 13 rotatable on the oppositely disposed arms of a spider 14 keyed or otherwise made fast to the shaft. Another gear 15 rotatable on the shaft is in mesh with the pinions 13 oppositely to the gear 12. Stop collars 16 confine the train against lateral movement. The yoke 11 is non-rotatably connected to a drum 17 concentric with the shaft, either by arms 18 pivoted to the extending ends of studs 19 on which the gears 10 rotate as in Fig. 8, or else is directly mounted on these studs as in Fig. 5. The end gear 15 is provided with a drum 20.

Rocker arms 21 extend upwardly and outwardly from the outer ends of the forward shafts 7 and similar members 22 are secured to the outer extremities of the rear shafts 8. The main body 23 of the vehicle rides on these arms which are curved to form rockers, the lateral and longitudinal movements of the body being prevented by the usual radius and torsion rods (not shown herein) extending to the drive axles.

A full elliptic spring 24 is supported between a pair of compression bars 25 and 26 transversely disposed in horizontal position below the main frame and centrally between the shafts 7 and 8. Flexible cords 27 are attached at one end to the drums 17 and at the other to the grooved peripheries of the smaller steps 28 of double differential pulleys 29 journaled on the outer ends of the member 25. Similar connections 30 connect the drums 20 on the shaft 7 with the peripheries of the larger steps of the pulleys 29. Similar connections 31 between the outer drums of the gears on the shafts 8 couple the outer drums 17 of these trains with the smaller steps 33 of a pair of differential pulleys 34 rotatably secured on the bar 26 and cords 35 connect the inner drums 20 of said trains with the larger peripheries of the pulleys 34. Flexible stays 36 are anchored at one end to the frame 5 and are each connected at the other end to the smaller steps 33 of the adjacent pulleys 34 and rear flexible stays 37 are secured at one end to the frame 5 and at the other to the peripheries of the smaller steps of the adjacent pulleys 29.

If the axles and the body move toward each other the rock arms 21 are depressed turning their respective shafts. The gear trains on these shafts are so proportioned relatively to the steps of the connected pulleys that the drums each have the same angular velocity as the step of the pulley to which each is coupled and if the pulleys themselves were not connected to the main frame no resistance would be given to the movements of the arms. Because, however, of this connection each pulley is caused to move toward the center of the frame with a speed depending upon the ratio of speeds between the respective drums of the connected gear train thereby tending to compress the spring 24. Unequal oscillation of the arms results in unequal movements of the pulleys which merely tend to rock the spring 24 and as the vibrations are communicated to the spring from opposite directions they nullify each other to a great extent and as a result it is found that the body maintains a substantially constant distance from the bed of the road traversed by the vehicle, all shocks being transmitted to the center spring and the rebound being practically nullified.

As indicated in Figs. 6, 7 and 9, the stays 36 and 37 and the connections 30 and 35 may be replaced by single cords 38 passing around the outer drum 17 with their depending ends 39 connected to a sub-frame 40 beneath the main axles, springs 41 being interposed between the latter and the sub-frame. In this case the rotation of the rock arms is transmitted to the sub-frame springs thereby preventing oscillations of the body. It is understood that the drums on which the cords are wound, if they are not of the same diameter, are driven at substantially the same peripheral speed by proper proportioning of the gears connecting them. The gear train is used for the purpose of reducing the motion of the rock arm before it is transmitted to the spring so that a slight compression or expansion of the spring takes care of a wide oscillation of the rock arm. Furthermore the application of the differential pulley to the cord aids in reducing materially the length of swing of the rock arm when it acts upon the spring as it winds up the cord more rapidly than a direct winding drum. A spring that is adaptable for use in this place is necessarily limited in its range of effective compression and expansion, and the interposition of the reducing trains and differential pulleys obviates the necessity of using a spring that has a wide limit of oscillation. Such a spring could not be successfully carried within the limits of available space on an automobile chassis, but by the device herein shown a comparatively stiff, short-throw or quick acting spring gives the same cushioning effect as a more resilient spring of slower, wider throw.

By this method of construction any oscillation of the tonneau is prevented as it rides evenly above the axles which may move up and down without communicating any motion to the body, the center spring recoil being prevented by its differential connections with the axle.

Obviously, changes in the details of construction may be made without departing from the spirit of the invention and I do not wish to limit myself to any particular form or arrangement of parts.

What I claim is:

1. In an automobile, a frame, a body above the frame, rock arms oscillatory on the frame for supporting the body, a differential reduction gear train operated by each arm, and a resilient shock absorbing means to which each train is connected, that is supported independently of the frame of the body.

2. In an automobile, a frame, a body above the frame, rock arms oscillatory on the frame for supporting the body, a differential reduction gear train connected to each arm, a pair of drums on each train arranged to be driven at different speeds in the same direction, a resilient shock absorbing means and flexible connections operatively connecting the drums of each train to the shock absorber to resist the movements of the drums of the latter when the arms are depressed.

3. In an automobile, a frame, a body above the frame, rock arms oscillatory on the frame for supporting the body, a differential reduction gear train connected to each arm, a pair of drums on each train arranged to be driven at different speeds in the same direction, resilient shock absorbing means and flexible connections operatively connecting the drums of each train to the shock absorber to resist the movements of the drums of the latter when the arms are depressed, the shock absorbing means being independent of the frame and the body.

4. In an automobile, a frame, a body above the frame, a pair of axially alined shafts journaled transversely of the frame at each end thereof, a rock arm on each shaft supporting the body, a differential reduction gear train operatively mounted on each shaft, a pair of drums on each train driven in the same direction at different speeds by the movements of the train, shock absorbing means and flexible means operatively connecting the drums of each train with the shock absorbing means and coöperating with the shock absorber to resist the movements of the rocks arms when the latter are depressed.

5. In an automobile, a frame, a body above the frame, a pair of axially alined shafts journaled transversely on the forward end of the frame, a pair of axially alined shafts journaled transversely of the frame on the rear end thereof, a rock arm extending upwardly and forwardly from each forward shaft, a rock arm extending upwardly and rearwardly from each rear shaft, a differential reduction gear train mounted on each shaft and provided with a pair of drums moved by the train in the same direction at different speeds, shock absorbing means, and flexible connections between the drums of each train and the shock absorbing means coöperating with the latter to resist the movements of the drums when the rock arms are depressed.

6. In an automobile, a frame, a body above the frame, a pair of axially alined shafts journaled transversely on the forward end of the frame, a pair of axially alined shafts journaled transversely of the frame on the rear end thereof, a rock arm extending upwardly and forwardly from each forward shaft, a rock arm extending upwardly and rearwardly from each rear shaft, a differential reduction gear train mounted on each shaft and provided with a pair of drums moved by the train in the same direction at different speeds, shock absorbing means, and flexible connections between the drums of each train and the shock absorbing means coöperating with the movements of the drums when the rock arms are depressed, the shock absorber being supported independently of the frame and body.

7. In an automobile, a frame, a body above the frame, shafts journaled transversely to the frame, rock arms on the shafts supporting the body, a differential reduction gear train on each shaft consisting of a gear journaled on the shaft, a yoke keyed to the shaft, a pair of planet gears journaled on the yoke in mesh at diametrically opposite points with the drive gear, a spider journaled on the shafts, a pair of planet gears journaled in axial alinement on the spider, a double idler gear journaled on the shaft meshing with the planet gears of both the spider and the yoke, a gear keyed to the shaft in mesh with the planet gears on the yoke, a drum concentric with the shaft carried by the main gear, and a drum carried by the yoke concentric with the shaft, resilient shock absorbing means independent of the frame and body and a flexible connection between each drum of each train and the shock absorbing means coöperating with the latter to resist the movements of the arms when the latter are depressed.

8. In an automobile, a horizontally disposed frame, a body above the frame normally in parallel relation thereto, pairs of axially alined shafts journaled transversely on the frame near each end thereof, rock arms extending upwardly and outwardly from the shafts and carrying the body, a differential reduction gear train mounted on each shaft and provided with a pair of drums driven by the train in the same direction at different speeds when the adjacent rock arm is moved, a compressible spring member between the pairs of shafts, presser bars held in spaced relation by the spring, a differential pulley journaled near each end of each bar and flexible connections secured at their respective ends to the drums of the trains and the alined differential pulley on the side of the spring remote from the drums, the speed of the differential pulley being proportioned to compensate for the difference in speeds of the drums, the flexible connections being arranged to compress the spring when any one of the rock arms is depressed.

9. In an automobile, a horizontally disposed frame, a body above the frame normally in parallel relation thereto, pairs of axially alined shafts journaled transversely on the frame near each end thereof, rock arms extending upwardly and outwardly from the shafts and carrying the body, a differential reduction gear train mounted on each shaft and provided with a pair of drums driven by the train in the same direction at different speeds when the adjacent rock arm is moved, a compressible spring member between the pairs of shafts, presser bars held in spaced relation by the spring, a differential pulley journaled near each end of each bar, flexible connections secured at their respective ends to the drums of the trains and the alined differential pulleys on the side of the spring remote from the drums, the speeds of the differential pulley being proportioned to compensate for the differences in speeds of the drums, the flexible connections being arranged to compress the spring when any one of the rock arms is depressed, and a flexible connection between the periphery of the smaller step of each differential pulley and the adjacent end portion of the frame adapted to resist the tendency of the pulley to rotate under the tension of the flexible connection leading from the drum to the other step.

In testimony whereof I affix my signature in presence of two witnesses.

ERNEST SCHORR.

Witnesses:
C. R. STICKNEY,
OTTO F. BARTHEL.